United States Patent Office 3,163,650
Patented Dec. 29, 1964

3,163,650
ALPHA-LOWER ALKYL, ALPHA CAMPHOR-
IMIDO ACETAMIDES
Torizo Takahashi and Hajime Fujimura, Sakyo-ku, Kyo-
to-shi, and Yoshio Hamashima, Atsumi-cho, Atsumi-
gun, Aichi-ken, Japan, assignors to Chugai Seiyaku
Kabushiki Kaisha, Tokyo, Japan, a corporation of
Japan
No Drawing. Filed Feb. 27, 1961, Ser. No. 91,586
Claims priority, application Japan, Mar. 8, 1960,
7,092/60; June 16, 1960, 27,892/60, 27,893/60;
July 7, 1960, 30,428/60, 30,429/60, 30,430/60
7 Claims. (Cl. 260—281)

This invention relates to the camphor imide derivatives of the general formula:

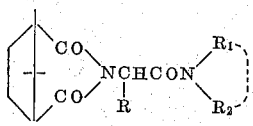

wherein R stands for a member selected from a group consisting of hydrogen atom and alkyl radical $R_1$ and $R_2$, which may be different or the same, stand for a member or members selected from a group consisting of hydrogen atom, aryl, alkyl, alkenyl, aralkyl and cycloalkyl radicals, and to the processes for the production of the same. The linkage $—R_1----R_2—$ may contain various atoms such as oxygen, sulphur or nitrogen atoms etc., between the radicals $R_1$ and $R_2$ or may show a direct bond of $R_1$ and $R_2$ without containing such heterogeneous atoms.

These compounds are useful as an analgesic agent.

The compounds according to the invention may be produced by the following processes in which R, $R_1$ and $R_2$ stand for the same atom or radicals as those defined above.

(A) Camphor imide is reacted with an N—$R_1$, $R_2$ substituted—($\alpha$-halogeno aliphatic acid) amide and this process may be expressed by the following equation:

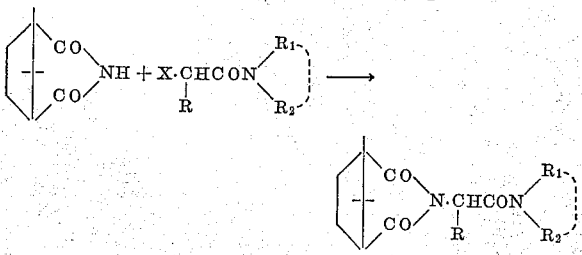

wherein X stands for a halogen atom.

(B) An N,N-(camphoroyl)-$\alpha$-amino aliphatic acid halogenide is reacted with ammonia or amine and this process may be expressed by the following equation:

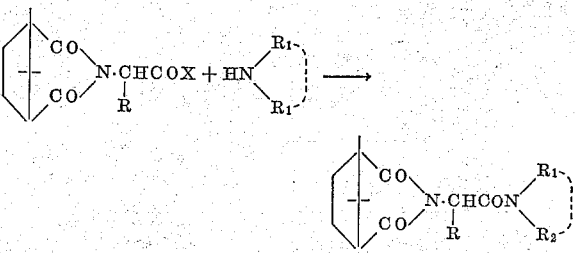

(C) Camphor imide is reacted with an $\alpha$-halogeno aliphatic acid alkylester to give an N,N-(camphoroyl)-$\alpha$-amino aliphatic acid alkylester which is then reacted with ammonia or amine and this process may be expressed by the following equation:

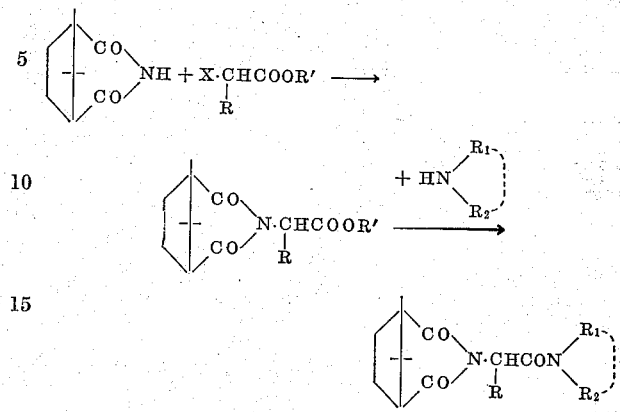

wherein R' stands for a lower alkyl radical.

In this process (C) the intermediate products of the general formula:

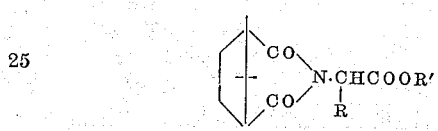

are the new compounds when R does not stand for a hydrogen atom.

The above processes for the production of the camphor imide derivatives of the invention are further illustrated below in more detail.

The process (A) may smoothly proceed when an inert solvent, for example, alcohol is used and a metal alkali is present.

The process (B) may be desirably carried out in an inert solvent, for example, chloroform.

As to the process (C), it is convenient to carry out the first step in an inert solvent, for example, alcohol and in the presence of a metal alkali. It is desirable for the second step to be effected in a solvent which may be alcohol.

As examples of the group

appearing in the general formula of the compound according to the invention there may be mentioned, for example, amino radical, methylamino radical, ethylamino radical, dimethylamino radical, diethylamino radical, methylethylamino radical, diallylamine radical, anilino radical, benzylamine radical, cyclohexylamino radical, cyclopentylamino radical, pyridino radical, pyrrolidino radical, piperidino radical, morpholino radical etc., and nuclearly substituted derivatives of them when they are in the form of a ring or contain a ring or rings therein.

These compounds may be converted into acid salts such as hydrochloride etc., by conventional methods.

Examples are now given but do never limit the compounds of the invention and the processes for the production of the same.

*Example 1*

5 g. of d-camphor imide are added to a solution of 0.63 g. of metal sodium in absolute ethanol and 4.6 g. of N,N-dimethylchloroacetamide are added thereto. The resulting mixture is heated on a water bath for 3 hours and then distilled to remove the ethanol. The residue is extracted with chloroform and the chloroform layer is washed with a diluted solution of sodium hydroxide and then with water and finally dried with potassium carbonate. When the chloroform is distilled off, crude crystals of N-(N',N'-d-camphoroyl)-glycyl-dimethylamine are obtained. Recrystallization from ether gives the pure product in a yield of 8 g. This product is colourless prism-like crystals of a melting point of 115° C. and considerably soluble in water.

Analysis (as $C_{14}H_{22}O_3N_2$):

|  | Percent C | Percent H | Percent N |
| --- | --- | --- | --- |
| Theoretical | 63.13 | 8.33 | 10.52 |
| Found | 63.03 | 8.42 | 10.61 |

Example 2

1 mol. of d-camphor imide, 1 mol. of metal sodium and 1.1 mol. of N,N-diethylchloroacetamide are refluxed in absolute ethanol for 5 hours. The reaction mixture is then treated in the same way as in Example 1 and crude crystals of N-(N',N'-d-camphoroyl)-glycyl-diethylamine are obtained. Recrystallization from mixed ether/petroleum ether solvents gives the product as colourless prism-like crystals; M.P. 105° C. Yield is 5 g. from 3 g. of the d-camphor imide.

Analysis (as $C_{16}H_{26}O_3N_2$):

|  | Percent C | Percent H | Percent N |
| --- | --- | --- | --- |
| Theoretical | 65.28 | 8.90 | 9.52 |
| Found | 65.50 | 9.00 | 9.60 |

Example 3

1 mol. of d-camphor imide, 1 mol. of metal sodium and 1.1 mol. of N-chloroacetyl piperidine are refluxed in absolute ethanol for 3 hours. The reaction mixture is then treated in the same way as in Example 1 and crude crystals of N-(N',N'-d-camphoroyl)-glycyl-piperidine are obtained. Recrystallization from mixed ether/petroleum ether solvents gives the product as colourless needle-like crystals; M.P. 86–87° C. Yield 60%.

Analysis (as $C_{17}H_{26}O_3N_2$):

|  | Percent C | Percent H | Percent N |
| --- | --- | --- | --- |
| Theoretical | 66.64 | 8.55 | 9.14 |
| Found | 66.84 | 8.61 | 9.21 |

Example 4

1 mol. of d-camphor imide, 1 mol. of metal sodium and 1.1 mol. of chloroacetamide are refluxed in absolute ethanol for 5 hours. The reaction mixture is then treated in the same way as in Example 1 and crude crystals of N-(N',N'-d-camphoroyl)-glycylamine are obtained. Recrystallization from mixed methanol/ether solvents gives the product as colourless plate-like crystals; M.P. 131° C. Yield 75%.

Analysis (as $C_{12}H_{18}O_3N_2$):

|  | Percent C | Percent H | Percent N |
| --- | --- | --- | --- |
| Theoretical | 60.48 | 7.61 | 11.76 |
| Found | 60.30 | 7.91 | 11.80 |

Example 5

1 mol. of d-camphor imide, 1 mol. of metal sodium and 1.1 mol. of N-chloroacetyl morpholine are refluxed in absolute ethanol for 5 hours. The reaction mixture is then treated in the same way as in Example 1 and crude crystals of N-(N',N'-d-camphoroyl)-glycyl-morpholine are obtained. Recrystallization from mixed methanol/ether solvents gives the product as colourless prism-like crystals; M.P. 134° C. Yield 82%.

Analysis (as $C_{16}H_{24}O_4N_2$):

|  | Percent C | Percent H | Percent N |
| --- | --- | --- | --- |
| Theoretical | 62.31 | 7.85 | 9.09 |
| Found | 62.49 | 7.71 | 9.11 |

Example 6

1 mol. of d-camphor imide, 1 mol. of metal sodium and 1.1 mol. of N-benzylchloroacetamide are refluxed in absolute ethanol for 5 hours. The reaction mixture is then treated in the same way as in Example 1 and crude crystals of N-(N',N'-d-camphoroyl)-glycyl-benzylamine are obtained. Recrystallization from methanol gives the product as colourless needle-like crystals: M.P. 169° C. Yield 76%.

Analysis (as $C_{19}H_{24}O_3N_2$):

|  | Percent C | Percent H | Percent N |
| --- | --- | --- | --- |
| Theoretical | 69.49 | 7.37 | 8.53 |
| Found | 69.68 | 7.63 | 8.62 |

Example 7

1 mol. of d-camphor imide, 1 mol. of metal sodium and 1.1 mol. of N-cyclohexylchloroacetamide are refluxed in absolute ethanol for 5 hours. The reaction mixture is then treated in the same way as in Example 1 and crude crystals of N-(N',N'-d-camphoroyl)-glycyl-cyclohexylamine are obtained. Recrystallization from mixed methanol/ether solvents gives the product as colourless prism-like crystals: M.P. 163° C. Yield 67%.

Analysis (as $C_{18}H_{32}O_3N_2$):

|  | Percent C | Percent H | Percent N |
| --- | --- | --- | --- |
| Theoretical | 67.47 | 8.81 | 8.74 |
| Found | 67.14 | 8.98 | 8.83 |

Example 8

1 mol. of d-camphor imide, 1 mol. of metal sodium and 1.1 mol. of N-methylchloroacetamide are refluxed in absolute ethanol for 4 hours. The reaction mixture is then treated in the same way as in Example 1 and crude crystals of N-(N',N'-d-camphoroyl)-glycyl-methylamine are obtained. Recrystallization from mixed methanol/ether solvents gives the product as colourless prism-like crystals: M.P. 139–140° C. Yield 73%.

Analysis (as $C_{13}H_{20}O_3N_2$):

|  | Percent C | Percent H | Percent N |
| --- | --- | --- | --- |
| Theoretical | 61.88 | 7.99 | 11.10 |
| Found | 61.64 | 8.19 | 11.21 |

Example 9

1 mol. of d-camphor imide, 1 mol. of metal sodium and 1.1 mol. of N-ethylchloroacetamide are refluxed in absolute ethanol for 5 hours. The reaction mixture is then treated in the same way as in Example 1 and crude crystals of N - (N',N'-d-camphoroyl)-glycyl-ethylamine are obtained. Recrystallization from ether gives the product as colourless sand-like crystals: M.P. 131° C. Yield 64%.

Analysis (as $C_{14}H_{22}O_3N_2$):

|  | Percent C | Percent H | Percent N |
| --- | --- | --- | --- |
| Theoretical | 63.13 | 8.33 | 10.52 |
| Found | 63.26 | 8.36 | 10.63 |

Example 10

1 mol. of d-camphor imide, 1 mol. of metal sodium and 1.1 mol. of N,N-diallylchloroacetamide are refluxed in absolute ethanol for 6 hours. The reaction mixture is then treated in the same way as in Example 1 and a crude oily product of N-(N',N'-d-camphoroyl)-glycyl-diallylamine is obtained. Vacuum distillation of it gives the pure product as a fraction boiling at 165° C./0.1 mm. Hg, which is a colourless oil. Yield 65%.

Analysis (as $C_{18}H_{26}O_3N_2$):

|  | Percent C | Percent H |
| --- | --- | --- |
| Theoretical | 67.90 | 8.23 |
| Found | 67.70 | 8.34 |

Example 11

1 mol. of d-camphor imide, 1 mol. of metal sodium and 1.1 mol. of chloroacetanilide are refluxed in absolute ethanol for 7 hours. The reaction mixture is then treated in the same way as in Example 1 and crude crystals of N-(N',N'-d-camphoroyl)-glycyl-aniline are obtained. Recrystallization from mixed ether/n-hexane solvents gives the product as sand-like crystals: M.P. 119° C. Yield 63%.

Analysis (as $C_{18}H_{22}O_3N_2$):

|  | Percent C | Percent H |
| --- | --- | --- |
| Theoretical | 68.77 | 7.05 |
| Found | 68.56 | 7.27 |

Example 12

1 mol. of d-camphor imide, 1 mol. of metal sodium and 1.1 mol. of N-chloroacetylcyclopentylamine are refluxed in absolute ethanol for 3 hours. The reaction mixture is then treated in the same way as in Example 1 and crude crystals of N-(N',N'-camphoroyl)-glycyl-cyclopentylamine are obtained. Recrystallization from ether gives the product as colourless plate-like crystals: M.P. 156° C. Yield 73%.

Analysis (as $C_{17}H_{26}O_3N_2$):

|  | Percent C | Percent H | Percent N |
| --- | --- | --- | --- |
| Theoretical | 66.64 | 8.55 | 9.14 |
| Found | 66.40 | 8.49 | 9.23 |

Example 13

1 mol. of d-camphor imide, 1 mol. of metal sodium and 1.1 mol. of N-chloroacetylpyrrolidine are refluxed in absolute ethanol for 3 hours. The reaction mixture is then treated in the same way as in Example 1 and crude crystals of N-(N',N'-d-camphoroyl)-glycyl-pyrrolidine are obtained. Recrystallization from ether gives the product as colourless prism-like crystals: M.P. 133° C. Yield 80%.

Analysis (as $C_{16}H_{24}O_3N_2$):

|  | Percent C | Percent H |
| --- | --- | --- |
| Theoretical | 65.72 | 8.27 |
| Found | 65.73 | 8.46 |

Example 14

1 mol. of d-camphor imide, 1 mol. of metal sodium and 1.1 mol. of N-chloroacetyl-2-methylpiperidine are refluxed in absolute ethanol for 6 hours. The reaction mixture is then treated in the same way as in Example 1 and a crude oily substance of N-(N',N'-d-camphoroyl)-glycyl-2-methylpiperidine is obtained. Vacuum distillation of it gives the pure product boiling at 180° C./0.15 mm. Hg, which is a colourless syrup. Yield 68%.

Analysis (as $C_{18}H_{28}O_3N_2$):

|  | Percent C | Percent H |
| --- | --- | --- |
| Theoretical | 65.67 | 8.87 |
| Found | 65.61 | 8.77 |

Example 15

1 mol. of sodium is dissolved in an excess of ethanol and 1 mol. of d-camphor imide is further dissolved therein. The resulting solution is added with 1.1 mol. of α-bromo-propionyl dimethylamine and then refluxed for 4 hours. The reaction mixture is subsequently distilled to remove the ethanol. The residue is then washed with a diluted aqueous solution of caustic soda and extracted with chloroform. The chloroform is distilled off from the chloroform layer. When the residue is distilled in vacuo, N-(N',N'-d-camphoroyl)-alanyl-dimethylamine is obtained as a syrup boiling at 166–170° C./0.3 mm. Hg. Yield 60%.

Analysis (as $C_{15}H_{24}O_3N_2$):

|  | Percent C | Percent H | Percent N |
| --- | --- | --- | --- |
| Theoretical | 64.26 | 8.63 | 9.99 |
| Found | 64.00 | 8.68 | 9.71 |

Example 16

1 mol. of d-camphor imide, 1 mol. of sodium and 1.1 mol of α-bromopropionyl diethylamine are refluxed in an excess of ethanol for 7 hours. The reaction mixture is then treated in the same way as in Example 15 and distilled in vacuo. N-(N',N'-d-camphoroyl)-alanyl-diethylamine is obtained as a syrup boiling at 170° C./0.4 mm. Hg. Yield 62%.

Analysis (as $C_{17}H_{28}O_3N_2$):

|  | Percent C | Percent H |
| --- | --- | --- |
| Theoretical | 66.20 | 9.15 |
| Found | 65.99 | 9.22 |

Example 17

1 mol. of d-camphor imide, 1 mol. of sodium and 1.1 mol. of α-bromopropionamide are refluxed in an excess of ethanol for 8 hours. The reaction mixture is then treated in the same way as in Example 15 and distilled to remove the chloroform. Recrystallization of the residue from methanol/ether gives N,N-d-camphoroyl alaninamide as colourless column-like crystals: M.P. 192° C. Yield 65%.

Analysis (as $C_{13}H_{20}O_3N_2$):

|  | Percent C | Percent H | Percent N |
| --- | --- | --- | --- |
| Theoretical | 61.88 | 7.99 | 11.10 |
| Found | 61.96 | 8.22 | 11.19 |

Example 18

1 mol. of d-camphor imide, 1 mol. of sodium and 1.1 mol. of N-α-bromopropionyl piperidine are refluxed in an excess of ethanol for 4 hours. The reaction mixture is then treated in the same way as in Example 15 and distilled in vacuo. N-(N',N'-d-camphoroyl)-alanyl-piperidine is obtained as a glassy mass boiling at 190° C./0.2 mm. Hg. Yield 75%.

Analysis (as $C_{18}H_{28}O_3N_2$):

| | Percent N |
|---|---|
| Theoretical | 8.74 |
| Found | 8.66 |

Example 19

2 g. of N,N-(d-camphoroyl)-glycyl chloride are dissolved in 30 cc. of chloroform and the solution is then blown with an excess of ammonia gas while being cooled by ice. After the reaction has been completed, the liquid reaction mixture is washed successively with diluted hydrochloric acid, water and finally aqueous sodium carbonate solution and then distilled to remove the chloroform. Recrystallization of the residue from a mixture of methanol and ether gives 1.1 g. of N-(N',N'-d-camphoroyl)-glycyl-amine.

Analysis (as $C_{12}H_{18}O_3N_2$):

| | Percent C | Percent H |
|---|---|---|
| Theoretical | 60.48 | 7.61 |
| Found | 60.41 | 7.81 |

Example 20

2 g. of N,N-(d-camphoroyl)-glycyl chloride are dissolved in 30 cc. of chloroform and the resulting solution is added with 2.3 g. of monoethylamine while being cooled by ice. After the completion of the reaction, the reaction mixture is then treated in the same way as in Example 19. Recrystallization from ether gives 1.5 g. of N-(N',N'-d-camphoroyl)-glycyl-ethylamine.

Analysis (as $C_{14}H_{22}O_3N_2$):

| | Percent C | Percent H |
|---|---|---|
| Theoretical | 63.13 | 8.33 |
| Found | 63.28 | 8.51 |

Example 21

2 g. of N,N-(d-camphoroyl)-glycyl chloride are dissolved in 30 cc. of chloroform and the resulting solution is added with 2 g. of dimethylamine while being cooled by ice. After the completion of the reaction, the reaction mixture is then treated in the same way as in Example 19. Recrystallization from ether gives 1.6 g. of N-(N',N'-d-camphoroyl)-glycyl-dimethylamine.

Analysis (as $C_{14}H_{22}O_3N_2$):

| | Percent C | Percent H | Percent N |
|---|---|---|---|
| Theoretical | 63.13 | 8.33 | 10.52 |
| Found | 63.30 | 8.51 | 10.67 |

Example 22

2 g. of N,N-(d-camphoroyl)-glycyl chloride are dissolved in 30 cc. of chloroform and the solution is added with 2.5 g. of diallylamine while being cooled by ice. After the completion of the reaction, the reaction mixture is then treated in the same way as in Example 19, and the chloroform is distilled off to leave an oily substance. Vacuum distillation of this substance gives 2 g. of N-(N',N'-d-camphoroyl)-glycyl-diallylamine as a fraction boiling at 165° C./0.1 mm.Hg.

Analysis (as $C_{18}H_{26}O_3N_2$):

| | Percent C | Percent H |
|---|---|---|
| Theoretical | 67.90 | 8.23 |
| Found | 67.80 | 8.34 |

Example 23

2 g. of N,N-(d-camphoroyl)-glycyl chloride are dissolved in 30 cc. of chloroform and the solution is added with 2 g. of aniline while being cooled by ice. After the completion of the reaction, the reaction mixture is then treated in the same way as in Example 19. Recrystallization from a mixture of ether and n-hexane gives 2 g. of N-(N',N'-d-camphoroyl)-glycyl-aniline.

Analysis (as $C_{18}H_{22}O_3N_2$):

| | Percent C | Percent H |
|---|---|---|
| Theoretical | 68.77 | 7.05 |
| Found | 68.48 | 7.17 |

Example 24

1 mol of d-camphor imide, 1 mol of sodium and 1.1 mol of methyl α-bromopropionate are refluxed in an excess of ethanol for 10 hours. The reaction mixture is then distilled to remove the ethanol. The residue is made alkaline by the addition of diluted aqueous ammonia and then extracted with ether. The ether is distilled off from the ethereal layer. Vacuum distillation of the residue gives N,N-d-camphoroyl-alanine methyl ester as a colourless oil boiling at 140° C./0.5 mm. Hg. Yield 63%.

Analysis (as $C_{14}H_{21}O_4N$):

| | Percent C | Percent H |
|---|---|---|
| Theoretical | 62.90 | 7.92 |
| Found | 62.89 | 8.14 |

Example 25

3 g. of ethyl N,N-(d-camphoroyl)-glycinate and 15 cc. of a 25% solution of ammonia in ethanol are heated in a sealed tube at 100° C. for 10 hours. After the completion of the reaction, the solvent is distilled off from the reaction mixture. Recrystallizaiton of the residue from a mixture of methanol and ether gives 1.5 g. of N-(N',N'-d-camphoroyl)-glycyl-amine.

Analysis (as $C_{12}H_{18}O_3N_2$):

| | Percent N |
|---|---|
| Theoretical | 11.76 |
| Found | 11.79 |

Example 26

3 g. of ethyl N,N-(d-camphoroyl)-glycinate and 10 cc. of a 35% solution of monomethylamine in methanol are heated in a sealed tube at 100° C. for 5 hours. After the completion of the reaction, the reaction mixture is then treated in the same manner as in Example 25. Recrystallization from a mixture of methanol and ether gives 2 g. of N-(N',N'-d-camphoroyl)-glycyl-methylamine.

Analysis (as $C_{13}H_{20}O_3N_2$):

| | Percent C | Percent H |
|---|---|---|
| Theoretical | 61.88 | 7.99 |
| Found | 61.66 | 8.20 |

Example 27

1.7 g. of ethyl N,N-(d-camphoroyl)-glycinate and 2 g. of a 70% aqueous solution of monoethylamine are heated in 10 cc. of methanol in a sealed tube at 100° C. for 8 hours. After the completion of the reaction, the reaction mixture is then treated in the same way as in Example 25. Recrystallization from ether gives 1.2 g. of N-(N',N'-d-camphoroyl)-glycyl-ethylamine.

Analysis (as $C_{14}H_{22}O_3N_2$):

|  | Percent C | Percent H |
|---|---|---|
| Theoretical | 63.13 | 8.33 |
| Found | 63.30 | 8.40 |

Example 28

3 g. of ethyl N,N-(d-camphoroyl)-glycinate and 10 cc. of a 40% solution of dimethylamine in methanol are heated in a sealed tube at 100° C. for 7 hours. After the completion of the reaction, the reaction mixture is then treated in the same way as in Example 25. Recrystallization from ether gives 2.1 g. of N-(N',N'-d-camphoroyl)-glycyl-dimethylamine.

Analysis (as $C_{14}H_{22}O_3N_2$):

|  | Percent C | Percent H | Percent N |
|---|---|---|---|
| Theoretical | 63.13 | 8.33 | 10.52 |
| Found | 63.24 | 8.40 | 10.58 |

Example 29

3 g. of ethyl N,N-(d-camphoroyl)-glycinate and 10 cc. of a 40% solution of diethylamine in ethanol are heated in a sealed tube at 100° C. for 10 hours. After the completion of the reaction, the reaction mixture is then treated in the same way as in Example 25. Recrystallization from a mixture of ether and petroleum ether gives 2.3 g. of N-(N',N'-d-camphoroyl)-glycyl-diethylamine.

Analysis (as $C_{16}H_{26}O_3N_2$):

|  | Percent C | Percent H | Percent N |
|---|---|---|---|
| Theoretical | 65.28 | 8.90 | 9.52 |
| Found | 65.34 | 8.95 | 9.68 |

Example 30

1 mol of methyl N,N-d-camphoroyl-alaninate is added with an excess of dimethylamine in methanol and the mixture is heated in a sealed tube at 100° C. for 10 hours. Subsequently, unreacted dimethylamine and methanol are distilled off. Vacuum distillation of the residue gives N-(N',N'-d-camphoroyl)-alanyl-dimethylamine as a colourless syrup boiling at 167–170° C./0.3 mm. Hg. Yield 50%.

Analysis (as $C_{15}H_{24}O_3N_2$):

|  | Percent N |
|---|---|
| Theoretical | 9.99 |
| Found | 10.01 |

Example 31

1 mol of methyl N,N-d-camphoroyl-alaninate is added with an excess of diethylamine in ethanol and the mixture is heated in a sealed tube at 100° C. for 12 hours. Thereafter, unreacted diethylamine and ethanol are distilled off. Vacuum distillation of the residue gives N-(N',N'-d-camphoroyl)-alanyl-diethylamine as a colourless syrup boiling at 170° C./0.4 mm. Hg. Yield 48%.

Analysis (as $C_{17}H_{28}O_3N_2$):

|  | Percent C | Percent H |
|---|---|---|
| Theoretical | 66.20 | 9.15 |
| Found | 66.40 | 9.35 |

What we claim is:

1. A camphor imide selected from the group of camphor imides having the following Formula I:

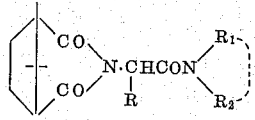

wherein R designates a member selected from the group consisting of hydrogen and lower alkyl; $R_1$ and $R_2$ designate a member selected from the group consisting of hydrogen, lower alkyl, lower alkenyl, phenyl and phenyl lower alkyl; and wherein $R_1$ and $R_2$, together with the nitrogen atom, is a member selected from the group consisting of pyrrolidino, piperidino, 2-methyl-piperidino and morpholino.
2. N-(N',N'-camphoroyl)-glycyl-diallylamine.
3. N-(N',N'-camphoroyl)-glycyl-benzylamine.
4. N-(N',N'-camphoroyl)-alanyl-amine.
5. α-Camphorimido-glycinamide.
6. α-Camphorimido-N,N-diethyl glycinamide.
7. α-Camphorimido-N,N diethyl propianamide.

References Cited by the Examiner
UNITED STATES PATENTS 2,952,685   9/60   Najer et al. _____ 260—326.3

IRVING MARCUS, *Primary Examiner.*
NICHOLAS S. RIZZO, WALTER A. MODANCE, *Examiners.*